(12) United States Patent
Zou et al.

(10) Patent No.: US 8,463,043 B2
(45) Date of Patent: *Jun. 11, 2013

(54) FEATURE DESIGN FOR CHARACTER RECOGNITION

(75) Inventors: Yu Zou, Beijing (CN); Ming Chang, Beijing (CN); Shi Han, Beijing (CN); Dongmei Zhang, Redmond, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,236

(22) Filed: Jun. 18, 2012

(65) Prior Publication Data

US 2012/0251006 A1    Oct. 4, 2012

Related U.S. Application Data (63) Continuation of application No. 13/118,045, filed on May 27, 2011, now Pat. No. 8,204,310, which is a continuation of application No. 11/772,032, filed on Jun. 29, 2007, now Pat. No. 7,974,472.

(51) Int. Cl.
*G06K 9/00* (2006.01)
*G06K 9/46* (2006.01)

(52) U.S. Cl.
USPC .......................................... 382/187; 382/190

(58) Field of Classification Search
USPC ................ 382/159, 181, 185–189, 190, 224, 382/228
See application file for complete search history.

(56) References Cited

U.S. PATENT DOCUMENTS

| | | | |
|---|---|---|---|
| 5,034,989 A | 7/1991 | Loh | |
| 5,212,769 A | 5/1993 | Pong | |
| 5,285,505 A | 2/1994 | Kim et al. | |
| 5,459,809 A | 10/1995 | Kim et al. | |
| 5,588,073 A | 12/1996 | Lee et al. | |
| 5,621,809 A | 4/1997 | Bellegarda et al. | |
| 5,644,652 A | 7/1997 | Bellegarda et al. | |
| 5,659,633 A | 8/1997 | Ilan et al. | |
| 5,708,727 A | 1/1998 | Tanaka et al. | |
| 5,745,599 A | 4/1998 | Uchiyama et al. | |
| 5,757,960 A | 5/1998 | Murdock et al. | |

(Continued)

FOREIGN PATENT DOCUMENTS

KR     20000036398 A     7/2000

OTHER PUBLICATIONS

Jun, et al. "On-line cursive Korean character recognition by using curvature model", IEEE, pp. 1051-1054, 1995.*

(Continued)

*Primary Examiner* — Daniel Mariam
(74) *Attorney, Agent, or Firm* — Lee & Hayes, PLLC (57) ABSTRACT

An exemplary method for online character recognition of characters includes acquiring time sequential, online ink data for a handwritten character, conditioning the ink data to produce conditioned ink data where the conditioned ink data includes information as to writing sequence of the handwritten character and extracting features from the conditioned ink data where the features include a tangent feature, a curvature feature, a local length feature, a connection point feature and an imaginary stroke feature. Such a method may determine neighborhoods for ink data and extract features for each neighborhood. An exemplary character recognition system may use various exemplary methods for training and character recognition.

19 Claims, 10 Drawing Sheets

U.S. PATENT DOCUMENTS

| | | | |
|---|---|---|---|
| 6,084,985 | A | 7/2000 | Dolfing et al. |
| 6,226,403 | B1 | 5/2001 | Parthasarathy |
| 6,339,655 | B1 * | 1/2002 | Aharonson et al. ........... 382/186 |
| 6,389,166 | B1 | 5/2002 | Chang et al. |
| 6,430,314 | B1 | 8/2002 | Ko |
| 6,556,712 | B1 * | 4/2003 | Loudon et al. ................ 382/187 |
| 6,891,971 | B2 | 5/2005 | Loudon et al. |
| 7,164,793 | B2 | 1/2007 | Williams et al. |
| 7,203,903 | B1 | 4/2007 | Thompson et al. |
| 2001/0052900 | A1 | 12/2001 | Lee |
| 2002/0118879 | A1 | 8/2002 | Hickerson et al. |
| 2011/0229038 | A1 | 9/2011 | Zou et al. |

OTHER PUBLICATIONS

Lee et al., "Data-driven Design of HMM Topology for On-line Handwriting Recognition," available at least as early as Apr. 30, 2007, at <<http://citeseer.ist.psu.edu/cache/papers/cs/19211/http:zSzzSzai.kaist.ac. krzSzPublicationzSzPaperzSzIJPRAI-15-1-JayLee.PDF/lee00datadriven.pdf>>, pp. 1-14.

Nathan et al., "Real-Time On-Line Unconstrained Handwriting Recognition using Statistical Methods," available at least as early as Apr. 30, 2007, at <<http://www.recognitiontechnologies.com/~beigi/ps/icassp95.ps>>, pp. 1-4.

Office Action for U.S. Appl. No. 13/118,045, mailed on Nov. 7, 2011, Yu Zou, "Feature Design for HMM Based Eastern Asian Character Recognition," 9 pages.

Tapia et al., "A Survey on Recognition of On-Line Handwritten Mathematical Notation." available at least as early as Apr. 30, 2007, at <<http://www.inf.fu-berlin.de/inst/pubs/techreport-B-07-01.pdf>>, Jan. 2007, pp. 1-17.

Tappert et al., "The State of the Art in On-Line Handwriting Recognition," available at least as early as Apr. 30, 2007, at <<http://csis.pace.edu/~ctappert/dps/pdf/pen-tappert.pdf>>, IEEE, vol. 12, No. 8, Aug. 1990, pp. 786-808.

* cited by examiner

FIG. 1

EXEMPLARY METHOD FOR DATA CONDITIONING AND
FEATURE EXTRACTION FOR EASTERN ASIAN CHARACTERS
200

FRAME 1: FEATURE 1, FEATURE 2, . . .
FRAME 2: FEATURE 1, FEATURE 2, . . .
FRAME 3: FEATURE 1, FEATURE 2, . . .
⋮
FRAME N: FEATURE 1, FEATURE 2, . . .

EXEMPLARY CURVATURE FEATURE
600

$$\begin{cases} \cos \Delta \theta_i = \dfrac{\Delta x_{i-1} \Delta x_i + \Delta y_{i-1} \Delta y_i}{\sqrt{\Delta x_{i-1}^2 + \Delta y_{i-1}^2} \times \sqrt{\Delta x_i^2 + \Delta y_i^2}} \\ \sin \Delta \theta_i = \dfrac{\Delta x_{i-1} \Delta y_i - \Delta y_{i-1} \Delta x_i}{\sqrt{\Delta x_{i-1}^2 + \Delta y_{i-1}^2} \times \sqrt{\Delta x_i^2 + \Delta y_i^2}} \end{cases}$$

EXEMPLARY CONNECTION POINT FEATURE
800

FEATURE DESIGN FOR CHARACTER RECOGNITION

CROSS-REFERENCE TO RELATED APPLICATION

This application is a continuation of U.S. patent application Ser. No. 13/118,045, filed on May 27, 2011, which is a continuation of U.S. patent application Ser. No. 11/772,032, titled "Feature Design for HMM Based Eastern Asian Character Recognition," filed on Jun. 29, 2007, now U.S. Pat. No. 7,974,472, all of which are incorporated herein by reference in their entirety.

BACKGROUND

Online handwritten Eastern Asian character recognition is a useful feature for mobile computing devices, such as Tablet PCs, mobile phones and PDAs. Many character recognition systems use a Hidden Markov Model (HMM) approach to recognize characters based on stochastic time sequential data; noting that HMM approaches have been used for years in speech recognition, which inherently rely on temporal information. An individual HMM includes states and state transitions that can be trained using appropriate training information. A group of trained HMMs and input information (e.g., online character information) can be used to predict a probable outcome for the input information (e.g., a character corresponding to the character information).

To apply a HMM approach to online Eastern Asian character recognition, a character sample is represented as time sequential data according to a set of "online features." More specifically, a process sometimes referred to as "feature extraction" is applied to online ink data to provide corresponding feature information. Given such information, a training process can build trained HMM models for use in online character recognition.

For online character recognition, feature extraction is applied to online ink data for a character and the resulting feature information is input to the trained HMMs. Next, the output from the trained HMMs is used to select a character that corresponds to the feature information and, indirectly, to the online ink data. Accuracy of the trained HMM models depends on a variety of factors, including the selected set of online features. In general, the selected set of online features should be rich enough to encode handwritten Eastern Asia characters, and effective to recognize various characters. Various techniques described herein pertain to designing useful online features fitting a HMM modeling approach.

SUMMARY

An exemplary method for online character recognition of East Asian characters includes acquiring time sequential, online ink data for a handwritten East Asian character, conditioning the ink data to produce conditioned ink data where the conditioned ink data includes information as to writing sequence of the handwritten East Asian character and extracting features from the conditioned ink data where the features include a tangent feature, a curvature feature, a local length feature, a connection point feature and an imaginary stroke feature. Such a method may determine neighborhoods for ink data and extract features for each neighborhood. An exemplary Hidden Markov Model based character recognition system may use various exemplary methods for training and character recognition.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Techniques for use in online character recognition systems for East Asian characters are described herein. Various techniques include defining features and using the defined features to extract information from online ink data for East Asian characters. The extracted information, sometimes referred to as "feature information," can be used to train a character recognition model or can be input to a character recognition model that, in turn, outputs a character that corresponds to the feature information.

More specifically, an exemplary method processes time sequential, online ink data for an East Asian character to provide feature information, which is then input to a character recognition model. Ink data processing can include, where required, re-sampling to ensure uniform spacing of ink data points for each character stroke. Ink data processing can break ink data into frames where the frames can be analyzed with respect to a set of predetermined features. For example, as described below, an exemplary set of features includes a tangent feature, a curvature feature, a local length feature, a connection point feature and an imaginary stroke feature. In turn, this set of features can enhance character recognition.

Features are described with respect to rules, which may be mathematical equations. A feature may be characterized using a number (e.g., an angle, a length, etc.), numbers (e.g., coordinates, etc.) or other representation. A relationship may exist between features where such a relationship may be quantified for purposes of character recognition. Extracted features of ink data may be represented in the form of a vector or array, for example, as suitable input for a recognition system.

Features allow ink data to be reduced in a manner that focuses on preserving characteristics that enhance or otherwise facilitate recognition. Feature extraction can also act to eliminate data or characteristics that are irrelevant or diminish recognition accuracy.

Figure 1:
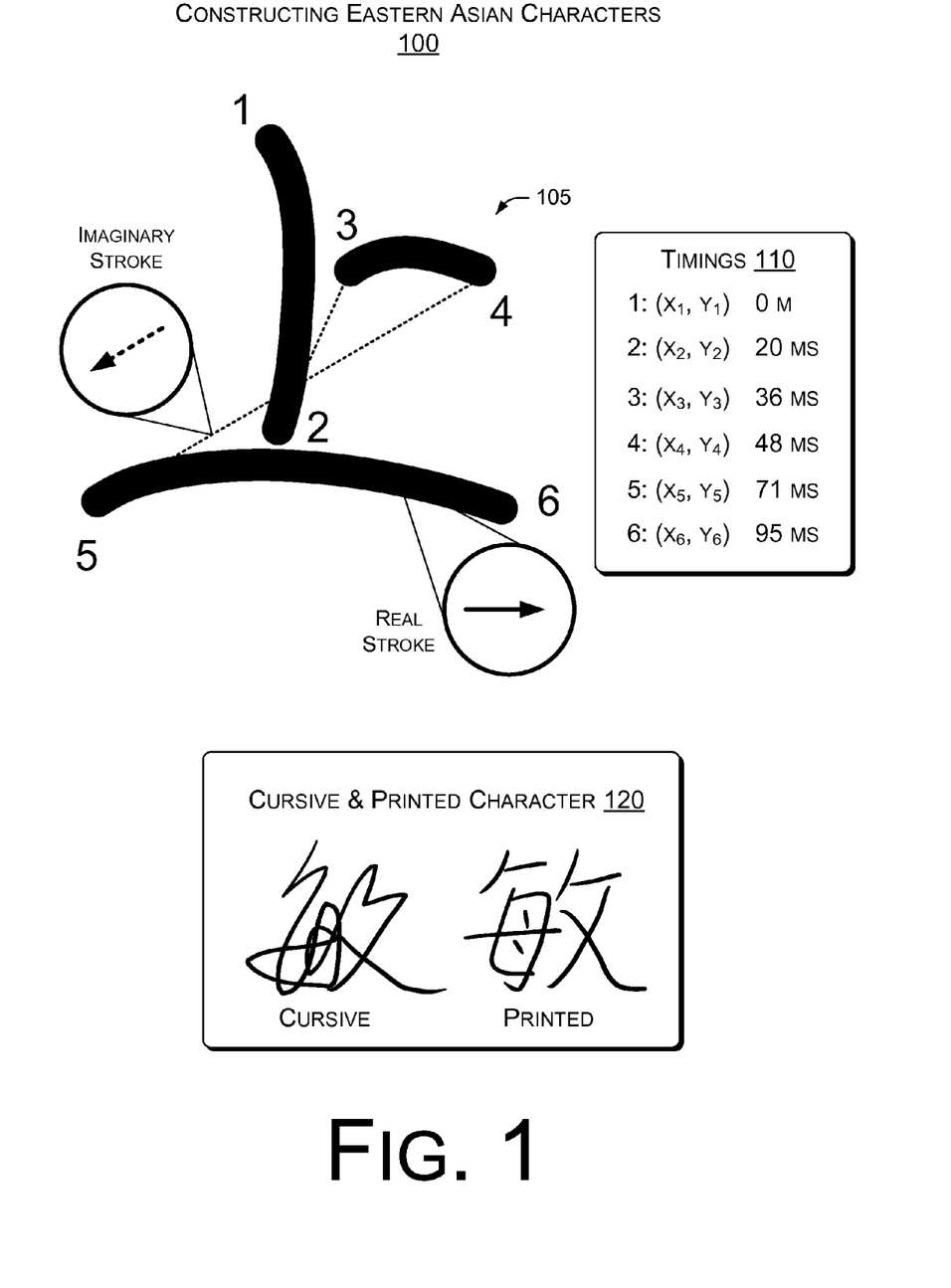
FIG. 1 is a diagram of an East Asian (EA) character along with indications of strokes, order of strokes and cursive and printed representations of an EA character.

FIG. 1 shows a diagram 100 of an East Asian (EA) character 105 along with indications of strokes and timings 110 for beginning and end points (1-6) of each stroke. A cursive and printed character 120 are also shown. As indicated with respect to the character 105, a stroke may be a real stroke (e.g., an ink stroke) or an imaginary stroke. Beginning and end points of individual strokes are labeled from 1 to 6, according to an order in which an individual drew the character. Timings 110 in milliseconds are shown for each of the points 1 through 6 along with Cartesian coordinates (x, y). In this example, a user started a first real stroke at point 1, which is accorded a time of 0 ms, and ended the first stroke at point 2 at a time of 20 ms. A second real stroke commenced at point 3 at a time of 36 ms and ended at point 4 at a time of 48 ms. A final real stroke commenced at point 5 at a time of 71 ms and ended at point 6 at a time of 95 ms. Where a sampling rate of 100 Hz is used, the smallest time increment would be 10 ms, hence, the time information may be rounded (e.g., 0 ms, 20 ms, 40 ms, 50 ms, 70 ms, 100 ms).

Offline handwriting data is usually converted into an image that lacks temporal information whereas online handwriting data may be collected a tablet device that samples a series points for a pen tip trajectory. While the timings 110 of FIG. 1 only show Cartesian coordinates and a time stamp, online handwriting data may included other information such as pressure and speed information. Therefore, online handwriting data has richer information than offline handwriting data. More specifically, online handwriting data typically includes information as to writing order of several strokes such as the sequential points 1 through 6 that correspond to three stokes of a character. This information can be utilized to improve accuracy of a handwriting recognition system, especially for recognition of online handwritten characters.

Devices configured to record handwriting typically rely on interaction between a writing implement (e.g., a pen) and a recording surface. When forming a character, each ink stroke may be recorded as a sequence of sampling points evoked by a pen tip's touch on a tablet, which represents the pen tip's trajectory between pen down and pen up. A user may also lift the writing implement between strokes such that movement of the implement is not recorded, however, movements not associated with ink strokes may be considered trivial compared to movements for ink strokes. More generally, a handwritten character has one or more ink strokes, which are not continuous in coordinates. For East Asian characters, a user may write a character consistently with a fixed number of strokes or a variable stroke number. For example, consider the cursive and printed versions of the character 120. In cursive East Asian character writing, a user tends to connect several part of a character into one part by writing it with only one stroke, noting that a user may use more than one stroke. In contrast, for printing East Asian characters, a user's stroke number for a character is usually quite stable. Whether an inconsistency arises in cursive writing or printed writing, inconsistency in stroke number for writing East Asian characters introduces some difficulties in building a HMM model for character recognition.

Referring again to the character 105 of FIG. 1, one or more imaginary strokes can be identified to facilitate modeling for character recognition. For example, an imaginary stroke can be defined as an imaginary linear movement of a pen from a previous stroke's pen up to the next stroke's pen down. With imaginary strokes between neighboring real strokes, all strokes are connected to form a continuous trajectory, on which a HMM can be build to model a handwritten character.

Figure 2:
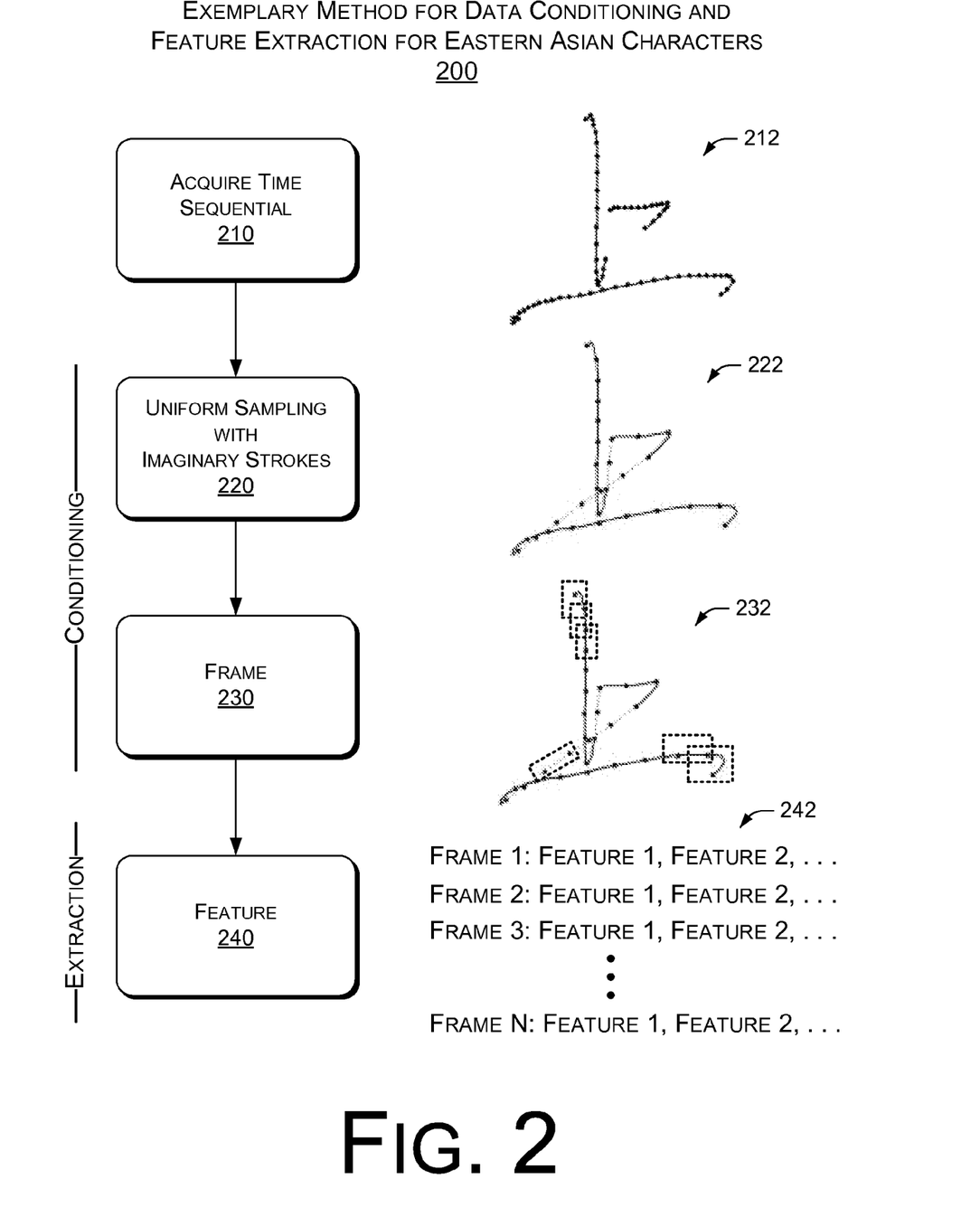
FIG. 2 is a diagram of an exemplary method for conditioning ink data and extracting features from conditioned ink data.

FIG. 2 shows an exemplary method 200 for data conditioning and feature extraction. The method 200 includes an acquisition block for acquisition of time sequential data 210. The acquired data are in the form of digitized data, digitized into discrete points as sampled by a digital tablet device or other recording device. A typical sampling rate for tablet devices is 100 Hz (a sample every 10 ms). For a constant sampling rate and uneven stroke rate, the original sampling points are not equal-distant as indicated by character 212 where dots correspond to sampled points. For example, when a stroke is written fast, sampling points are coarse (see vertical stroke in character 212); otherwise, sampling points are fine, even redundant (see left end of the lower horizontal stroke in character 212). Based on original sampling, two neighboring sampled points could be an ink frame. Obviously, in such a scheme trajectory lengths of frames are variable, so speed information would be implied in the frames of such data.

To overcome limitations associated with uneven and redundant data points, the method 200 includes data conditioning using a uniform sampling block 220 that converts the acquired time sequential data for a character 212 into uniform sampled data for the character 222. In this example, the uniform sampling includes sampling for real strokes and for imaginary strokes. Some temporal information is preserved in uniform sampling, in particular, sequence is preserved. Further, for imaginary strokes, points include temporal information as well. Through such conditioning, the character 222 can be represented as a contiguous, sequential set of data points in a two-dimensional space.

In the example of FIG. 2, uniform sampling segments original ink data into equal-distant two point ink frames. Comparing with original sampling, this approach of framing is independent of writing speed. Thus, a HMM based recognition system can operate independent of writing speed (i.e., the model does not have to account for writing speed). Another benefit of uniform sampling is the ability to filter out redundant points as acquired by the originally sampling technique. Overall, a uniform sampling approach can make a HMM model more robust and efficient.

As described herein, a HMM based character recognition system uses local information of ink to recognize a handwritten character. The method 200 provides such information. In particular, the method 200 uses a frames approach that separates ink trajectories for both real strokes and imaginary strokes into ink frames. A frame block 230 assigns frames to the uniform data for the character 222, as indicated by the dotted line boxes in the character 232; noting that the frames in this example include real stroke frames and imaginary stroke frames. With imaginary strokes, a contiguous set of time sequential frames can be generated. By including imaginary strokes, ink data for a handwritten printed character can be represented as one whole sequence. Further, information included in imaginary strokes becomes available for training and character recognition (see, e.g., feature 900 of FIG. 9). While frames shown are two-point frames, other criteria may be used for frames (e.g., three-point frames, etc.).

After the character data has been broken into frames, then in a feature extraction phase, a feature block 240 extracts local features on each ink frame per the table 242 (e.g., frame 1 includes feature 1, feature 2, etc., where "feature 1" may be a parameter for information as to the nature or character of the feature). Feature extraction optionally includes neighborhood identification, as explained further below. Information from the feature extraction phase may then be analyzed locally, within a neighborhood or globally and input to a character recognition system to make a recognition decision.

Figure 3:
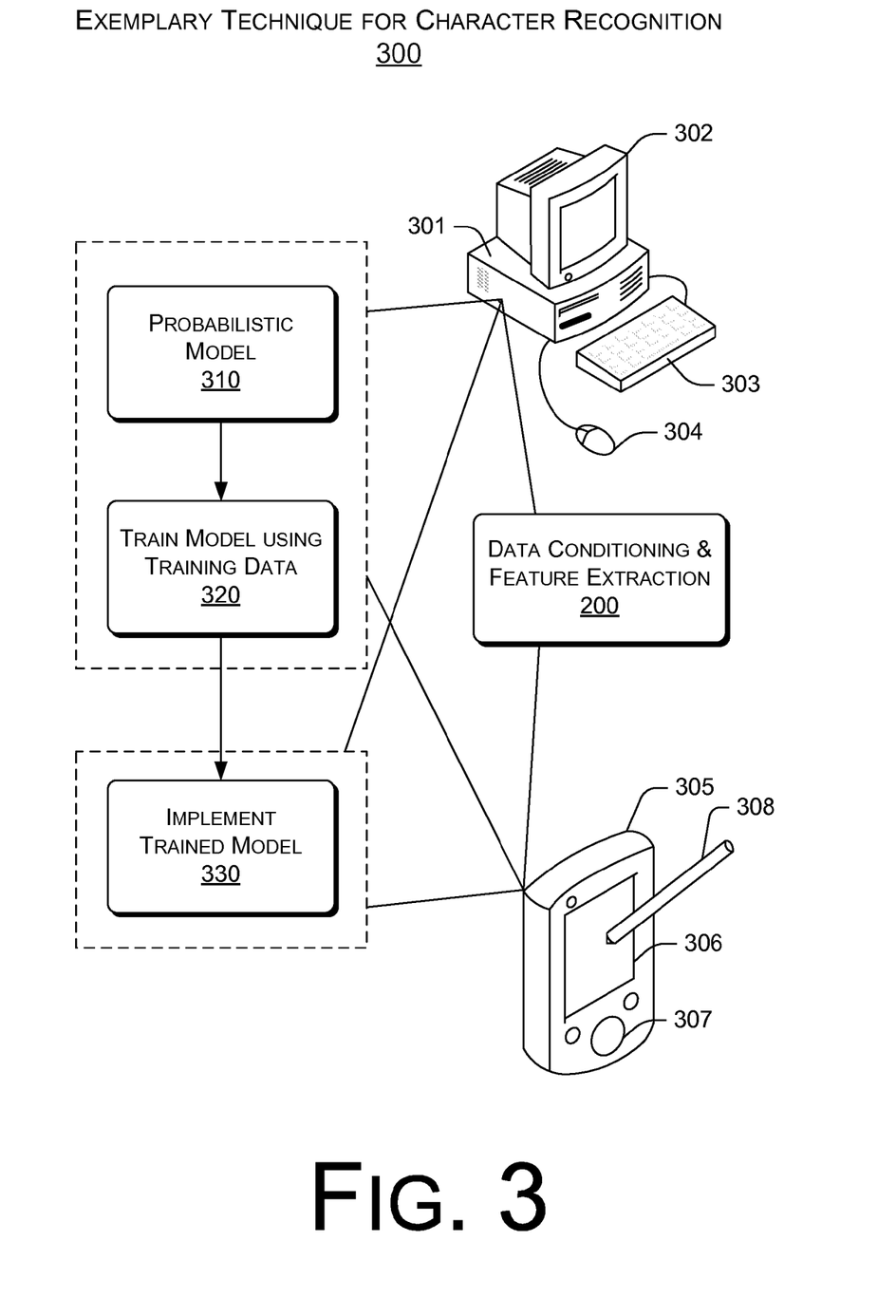
FIG. 3 is a diagram of an exemplary technique for character recognition using a probabilistic model along with some examples of computing devices that may implement all or part of such a technique.

FIG. 3 shows an exemplary technique for character recognition 300 that uses the data conditioning and feature extraction method 200. FIG. 3 also shows some examples of computing devices that may implement all or part of such a technique. The technique 300 includes selection of a probabilistic model 310 (e.g., a Bayesian model, HMM, or other type of probabilistic model), training of the model using training data 320 and implementation of the trained model 330. Training data may be from individuals that have drawn the various characters or it may be generated data based on rules commonly used in drawing various characters. As explained with respect to the method 200 of FIG. 2, handwriting data is conditioned prior to feature extraction where the resulting processed data can be used for training 320 or character recognition 330.

FIG. 3 shows computing devices 301 and 305, which may be a desktop computer and a handheld computer, respectively. The computing device 301 includes a display 302, a keyboard 303 and a mouse 304. The computing device 305 includes a display 306, user input feature(s) 307 and a stylus 308 (e.g., a desktop PC, tablet PC, multiprocessor workstation, etc.). The device 305 is generally a handheld computing device such as a PDA, a cell phone, etc. The device 305 may be configured for wireless communication with a network and/or one or more other devices. For either the computing device 301 or the computing device 305, a user may draw an EA character and the implemented trained model 330 may recognize the drawing (e.g., strokes) as being a particular EA character. In turn, the computing device may take any of a variety of actions (e.g., audible response, character selection and display response, etc.). As described herein, the exemplary method 200 may be used to condition data for training and recognition. The method 200 may operate on the device 301 and/or the device 305. As training a character recognition model (e.g., HMM based model) can require considerable computational resources, a lightweight device (e.g., the device 305) may provide handwriting data for use in training by a device with more computational resources (e.g., the device 301). Training may employ more than one computing device.

In some instances, data may be acquired by one device and conditioned by another device for use in training and/or character recognition. For example, a tablet device may be a portable lightweight device that communicates wirelessly with another computing device. In such an arrangement, the tablet device may simply sample a user's handwriting at a set sampling rate and stream such data to the other device for conditioning and recognition. Consider a remote control for a home entertainment system, a tablet may simply act to acquire data and transmit it to a set top box or computer that includes character recognition software and home entertainment software. As a user draws a character on the tablet, the other device may show the recognized character on a screen (e.g., a television screen) and then take appropriate action based on the character (e.g., where the character is an instruction or part of an instruction).

Figure 4:
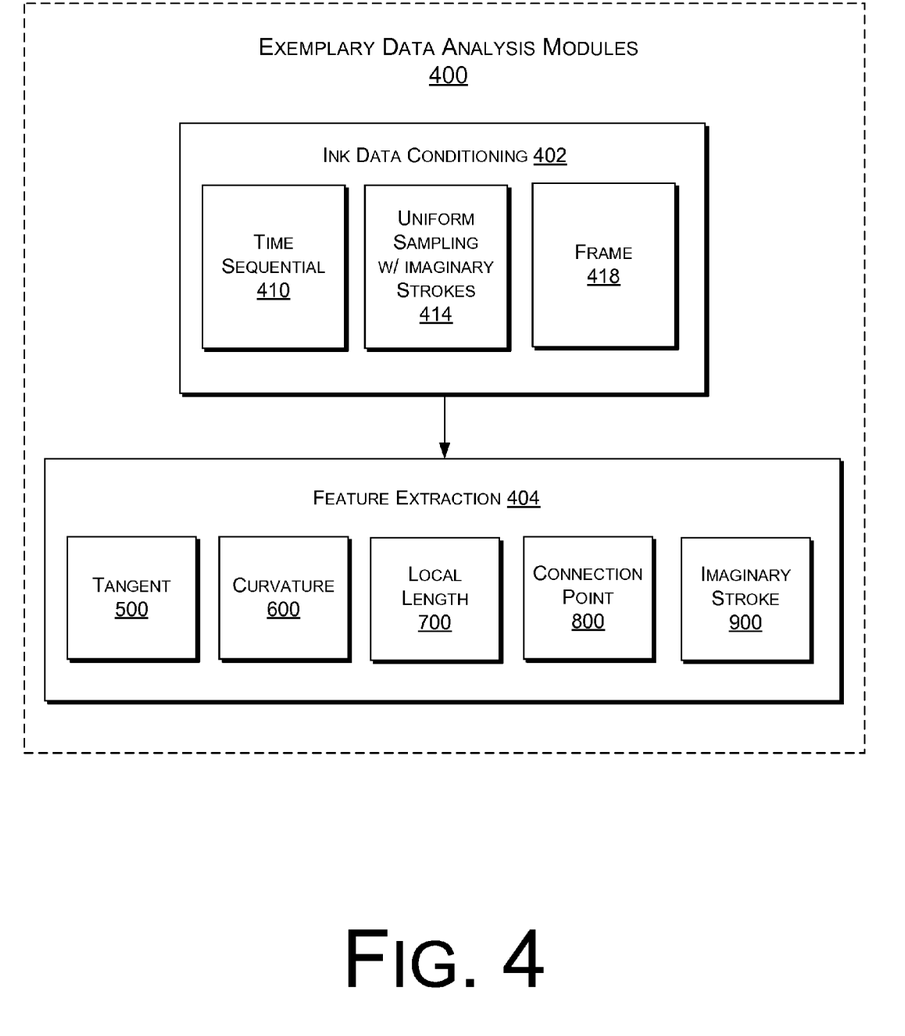
FIG. 4 is a diagram of various data analysis modules for ink data conditioning and feature extraction for EA characters.

FIG. 4 shows various modules 400 that may be used in training and/or character recognition. The modules 400 are grouped as ink data conditioning modules 402 and feature extraction modules 404. An arrow from the conditioning modules 402 to the feature extraction modules 404 indicates that the ink data conditioning modules 402 support feature extraction by the feature extraction modules 404.

The ink data modules 402 include an acquisition module 410 for acquisition of time sequential ink data, a uniform sampling with imaginary strokes module 414 for ensuring uniform sampling of data for further analysis and a frame module 418 for assigning frames to the ink data. In instances where cursive data is acquired, imaginary strokes may be assigned to portions that connect identified real strokes of the cursive data.

Once ink data has been conditioned according to one or more of the modules 402, then feature extraction may occur using the feature extraction modules 404. The feature extraction modules 404 include modules for a tangent feature 500, a curvature feature 600, a local length feature 700, a connection point feature 800 and an imaginary stroke feature 900.

Figure 5:
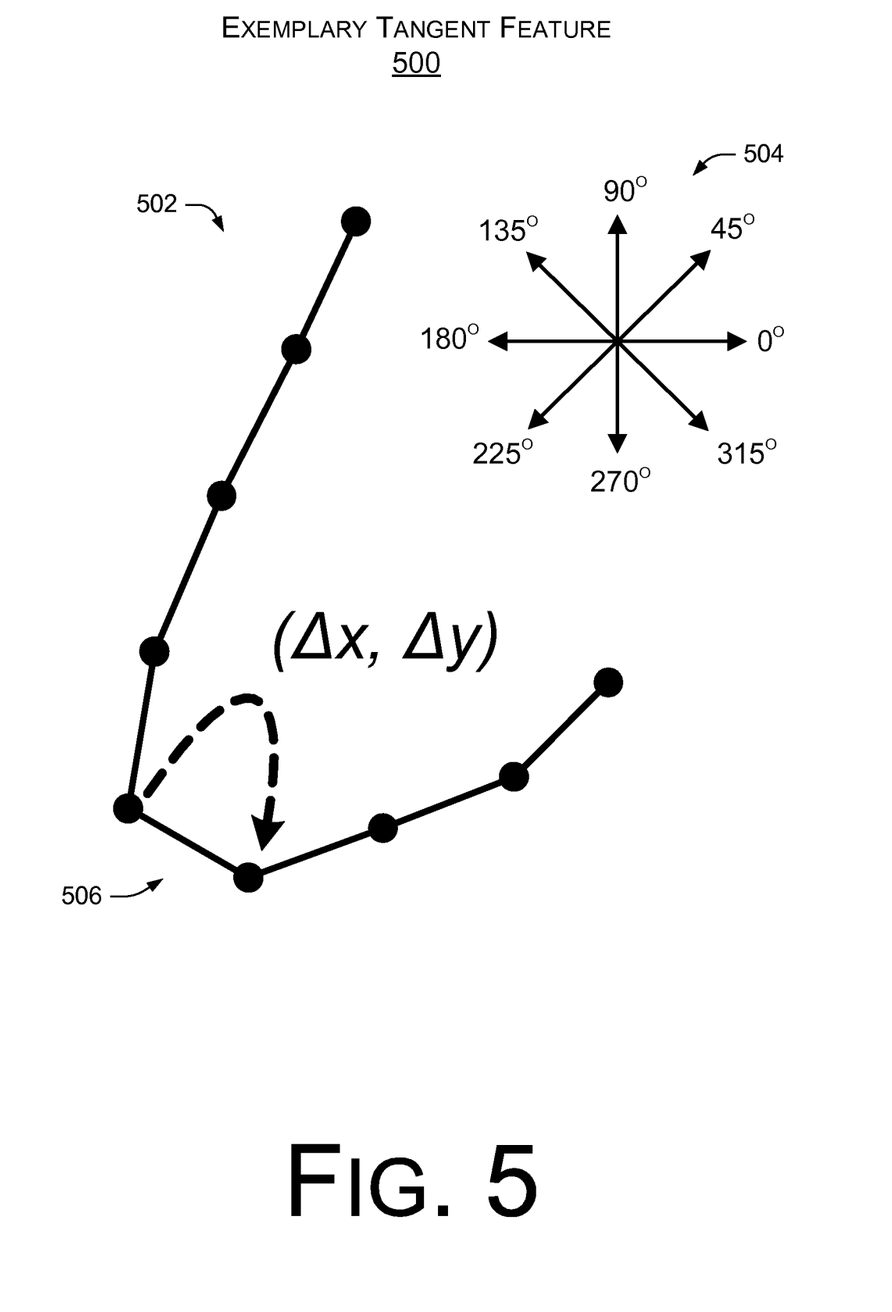
FIG. 5 is a diagram of an EA character with reference to an exemplary tangent feature.

The features 500, 600, 700, 800 and 900 are explained in more detail below with respect to FIGS. 5-9, respectively. FIG. 5 shows the tangent feature 500 as applied to uniformly sampled points for a portion of a character 502. A group of arrows 504 is representative of eight predominant writing directions for handwritten East Asian characters. While the directions are offset by 45°, this is mainly for purposes of explanation as some variations may occur between these eight directions. In general, a real stroke is defined as a trajectory from a "pen-down" to a "pen-up," which may include a substroke trajectory in one direction and another substroke trajectory in another direction. Substrokes include one or more frames. As described herein, the tangent feature 500 allows substrokes and/or frames to be classified as being along one of the eight directions. As shown in FIG. 5, the directions depend on time sequential information. For example, a substroke with a tangent direction of 135° and a substroke with a tangent direction of 315° would appear the same but can be distinguished based on temporal information (i.e., information pertaining to starting point and ending point of the substroke or stroke).

The tangent feature can assess a character as a link of direction movements. For example, given ink sampling points $((x_0, y_0), (x_1, y_1), \ldots, (x_n, y_n))$, a tangent feature on frame i is defined as $(\Delta x_i, \Delta y_i)$, where $\Delta x_i = x_i - x_{i-1}$, $\Delta y_i = y_i - y_{i-1}$. In these equations, the tangent feature relates to movement of the writer's pen tip on frame i. Where uniform sampling is applied and a frame is defined as being two successive sampled points, each frame's length is the same and the tangent feature captures writing direction for a frame. The frame feature module 500 can provide a pair of parameter values that indicate a direction for each frame (e.g., $\tan \Theta = \Delta y / \Delta x$).

Figure 6:
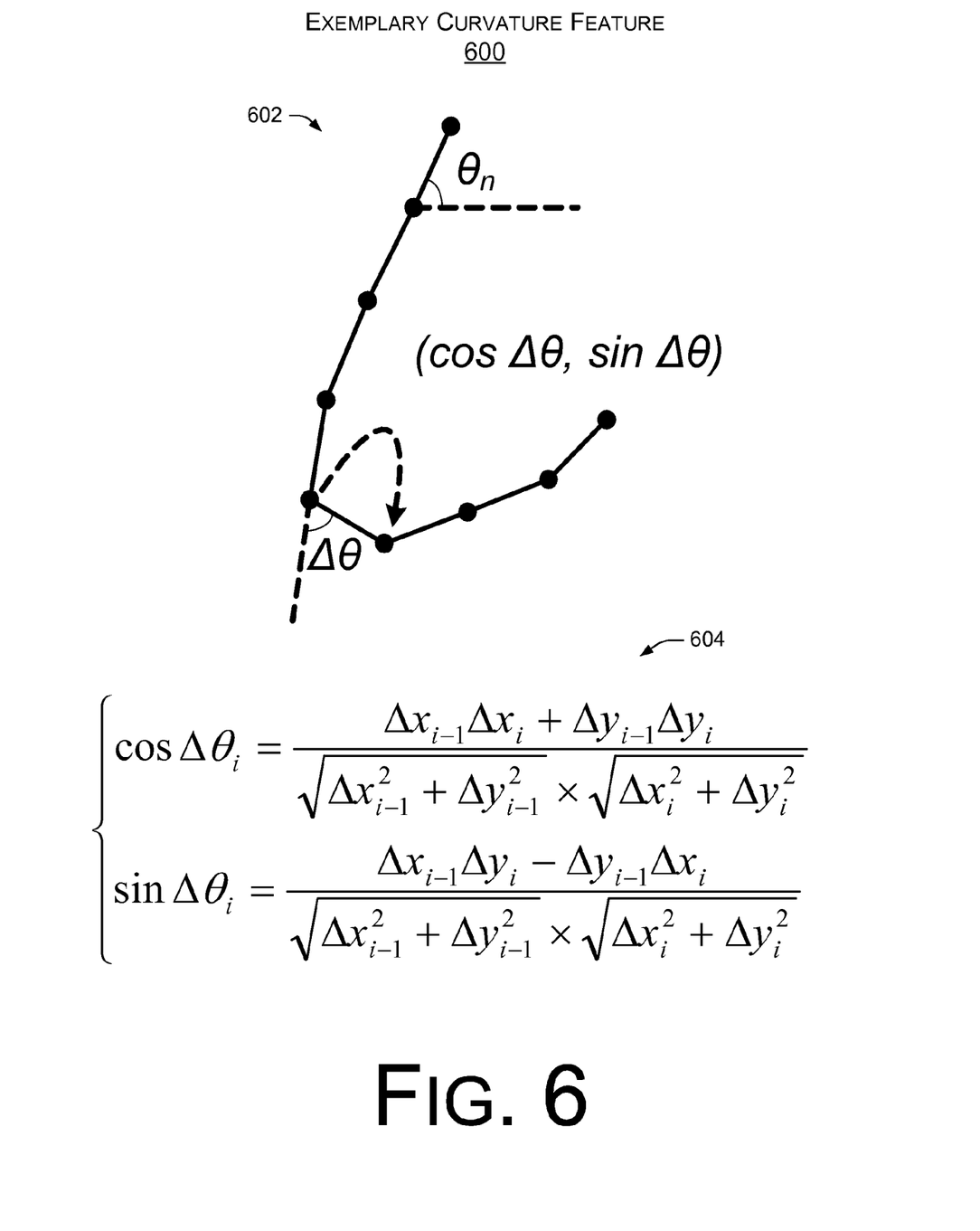
FIG. 6 is a diagram of an EA character with reference to an exemplary curvature feature.

FIG. 6 shows the curvature feature 600 as applied to uniformly sampled points for a portion of a character 602. A series of equations 604 are also shown for calculating parameter values based on Cartesian coordinates for the uniformly sampled points. For adjacent two point frames, the curvature feature 600 is defined as $(\cos \Delta \theta_i, \sin \Delta \theta_i)$, where $\Delta \theta_i$ is the turning angle from frame i−1 to frame i, where frame i−1 is drawn earlier in time than frame i. Thus, the curvature feature 600 of FIG. 6 provides a pair of parameter values that represent curvature between two adjacent ink frames.

Trials using a HMM based character recognition system demonstrated that the curvature feature 600 is helpful to recognize a state transition from a previous writing direction to the next writing direction, because a sufficiently large turn angle is observed when writing direction is changed (see, e.g., the eight directions 504 of FIG. 5). As already mentioned, HMM models rely on state transitions and hence a feature that provides transition information improves recognition accuracy, significantly.

Figure 7:
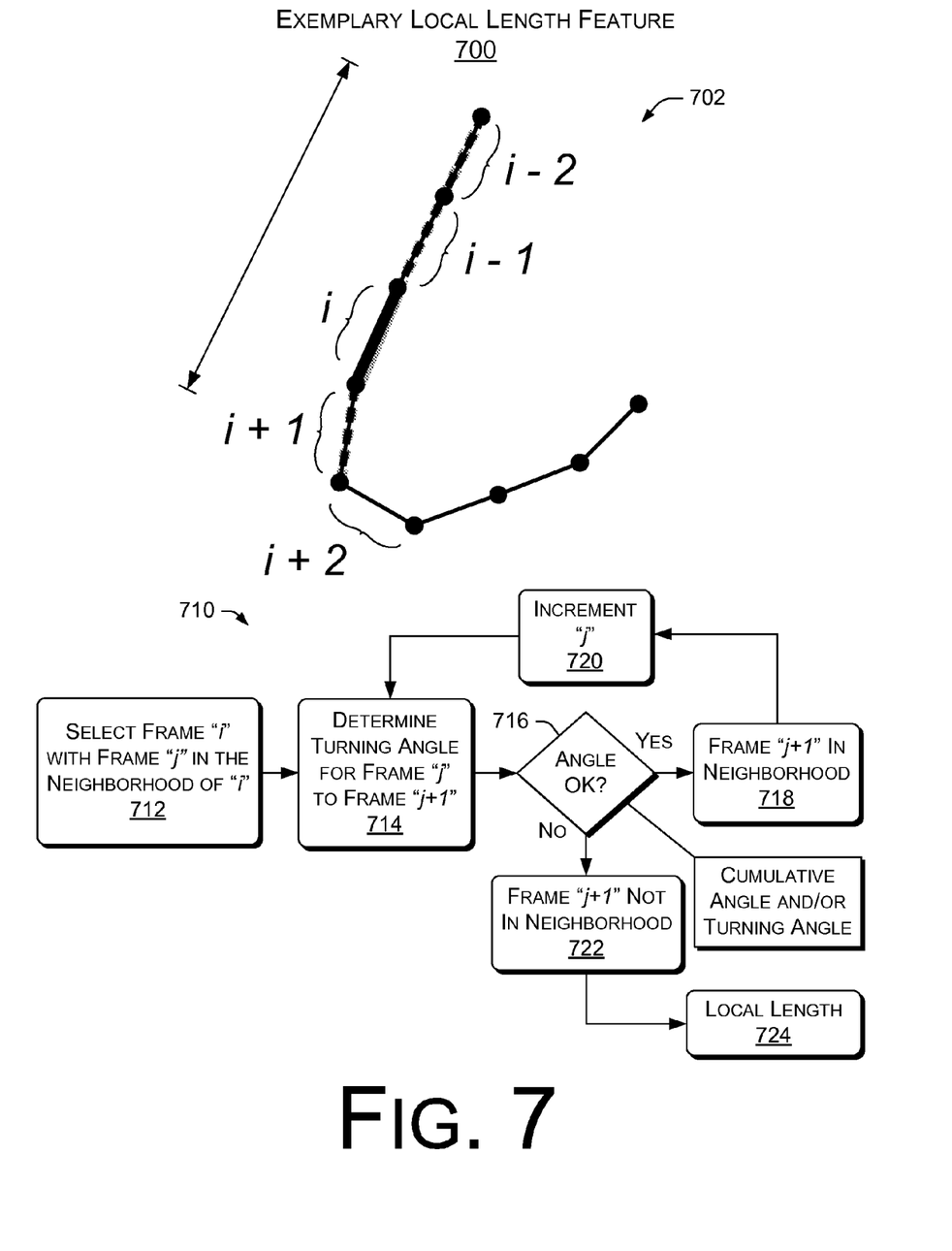
FIG. 7 is a diagram of an EA character with reference to an exemplary local length feature and an exemplary method for determining neighborhoods.

FIG. 7 shows the local length feature 700 as applied to uniformly sampled points for a portion of a character 702 along with an exemplary method 710 for use in determining a frame's neighborhood. As described herein, the local length feature 700 can characterize total trajectory length of a frame's neighborhood. A neighborhood is defined as a frame's preceding and successive frames whose direction is similar to the given frame, for example, according to one or more similarity criteria (e.g., tangent, curvature, etc.). For example, using a turning angle criterion, a neighborhood may be a region of several successive ink frames between two corner points (noting that a corner may be formed between a real stroke and an imaginary stroke).

As mentioned, the tangent feature can provide a pair of parameter values for each frame (e.g., $\Delta x$, $\Delta y$). To assess local length, an algorithm may start with a given frame (i) and transit to one or more preceding frames (e.g., i−1, i−2) and one or more successive frames (e.g., i+1), which may occur one by one. In a particular example, when transiting frames, turning angle (e.g., absolute value of tangent angle difference between two frames) between frames is accumulated and, if the accumulated turn angle is above a given predetermined threshold (e.g., about 30°), transit is stopped and the transited frames are classified as belonging to a neighborhood. After the neighborhood is determined, accumulated length for the neighborhood may be calculated and used in training and character recognition.

The method 710 is for marching forward to successive frames; noting that a similar method can be used for marching backward to preceding frames. In a selection block 712, a frame "i" is selected with a frame "j" in the neighborhood of frame "i." Next, a determination block 714 determines turning angle for the frame "j" in the neighborhood to its successive frame "j+1." A decision block 716 decides if the angle is OK, for example, whether it meets one or more criteria (e.g., direction limits). As indicated in the example of FIG. 7, the decision block 716 may consider cumulative angle and/or turning angle to make such a decision. If the decision block 716 decides that the criterion or criteria are met, then the frame "j+1" is marked per block 718 as being in the neighborhood of frame "i" and the counter "j" may be incremented per block 720 (e.g., set to j+1). If the angle is not OK, then the frame is not in the neighborhood per block 722, which can indicate that frame "j" is the last frame in the neighborhood. The method 710 may calculate a local length for the identified neighborhood per a local length block 724. Referring to the character portion 702, the frame "i+2," as analyzed with respect to frame "i," may cause the cumulative angle to exceed a limit. Hence, one neighborhood may include frames "i−2" to "i+1" and the block 712 may recommence the method 710 at frame "i+2" to determine the extent of an adjacent neighborhood.

As described herein, local length is determined for a neighborhood. Where uniform sampling is used, the length of each frame is the same. Thus, the local length of a neighborhood may be calculated as the number of frames multiplied by the frame length. Alternatively, the number of frames alone in a neighborhood can serve as a local length parameter value. In some instances, these approaches provide estimates of actual local length, noting that turning angle and/or cumulative angle criteria can affect the accuracy of such estimates. In other words, where the cumulative angle criterion for a neighborhood is large, then it is likely that the frame length multiplied by the number of frames in the neighborhood will be a rough estimate of local length.

Figure 8:
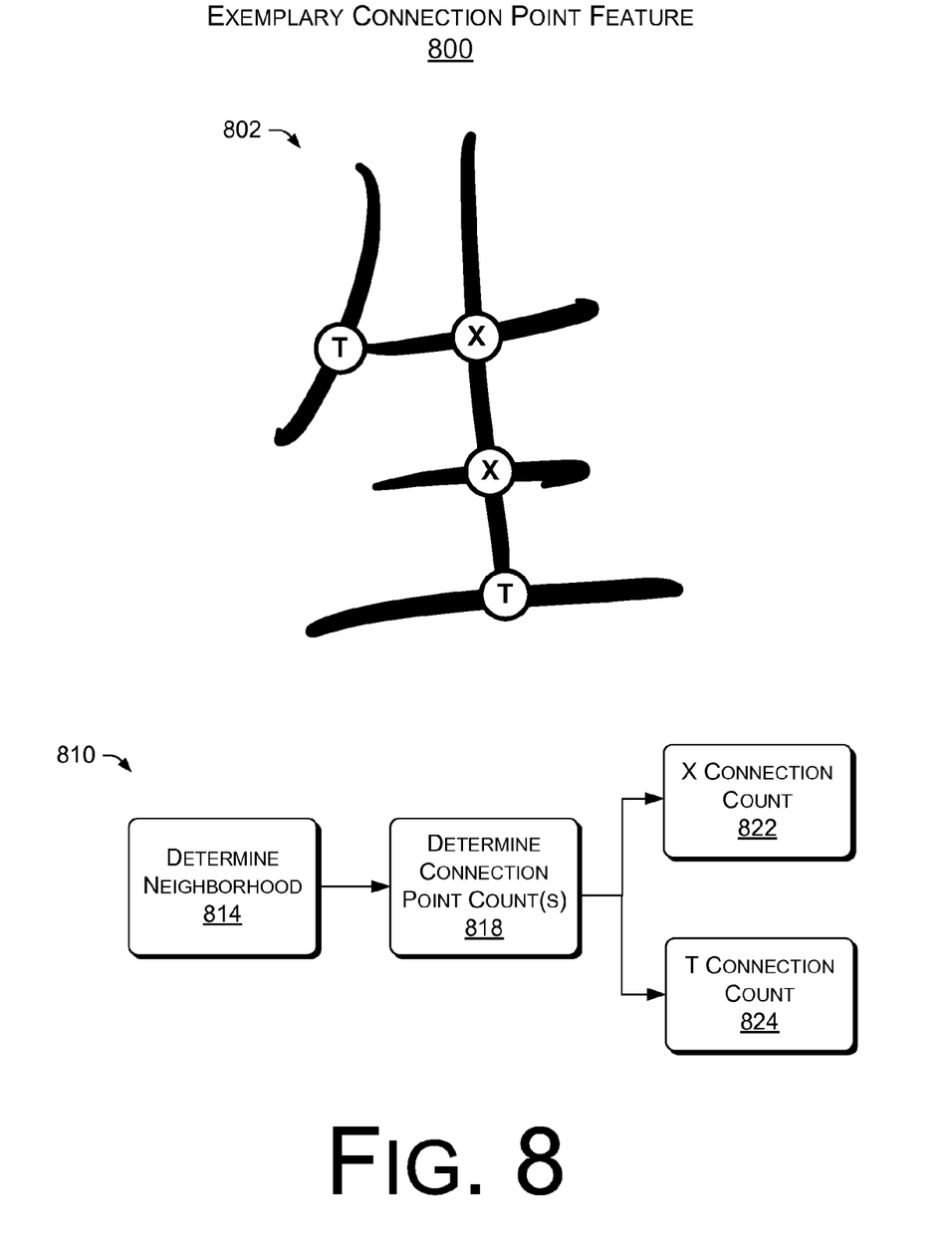
FIG. 8 is a diagram of an EA character with reference to an exemplary connection point feature.

FIG. 8 shows a connection point feature 800 with respect to an East Asian character 802 and an exemplary method 810 for determining connection point count. Connection point count feature is defined as accumulated connection point count of a frame's neighborhood. In FIG. 8, the Chinese character 802, includes "X" connection points (cross connection) and "T" connection points (T connection). A count can distinguish these two types of connection points and a parameter value may be provided for each type of connection count to train or to recognize a character.

To calculate a parameter value for cross connections, all cross connection points between strokes are found first, and each connection point is associated with two ink frames that make the cross. The same approach can be used for T connections. Per the exemplary method 810, a determination block 814 determines a neighborhood for a frame and then another determination block 818 determines connection point count (e.g., X count or T count or total X and T count) or counts (e.g., X count and T count) for the neighborhood. In other words, when calculating a connection point count feature parameter value for a frame, the frame's neighborhood is found first then, in the neighborhood, all connection points of a certain type or types are counted.

Figure 9:
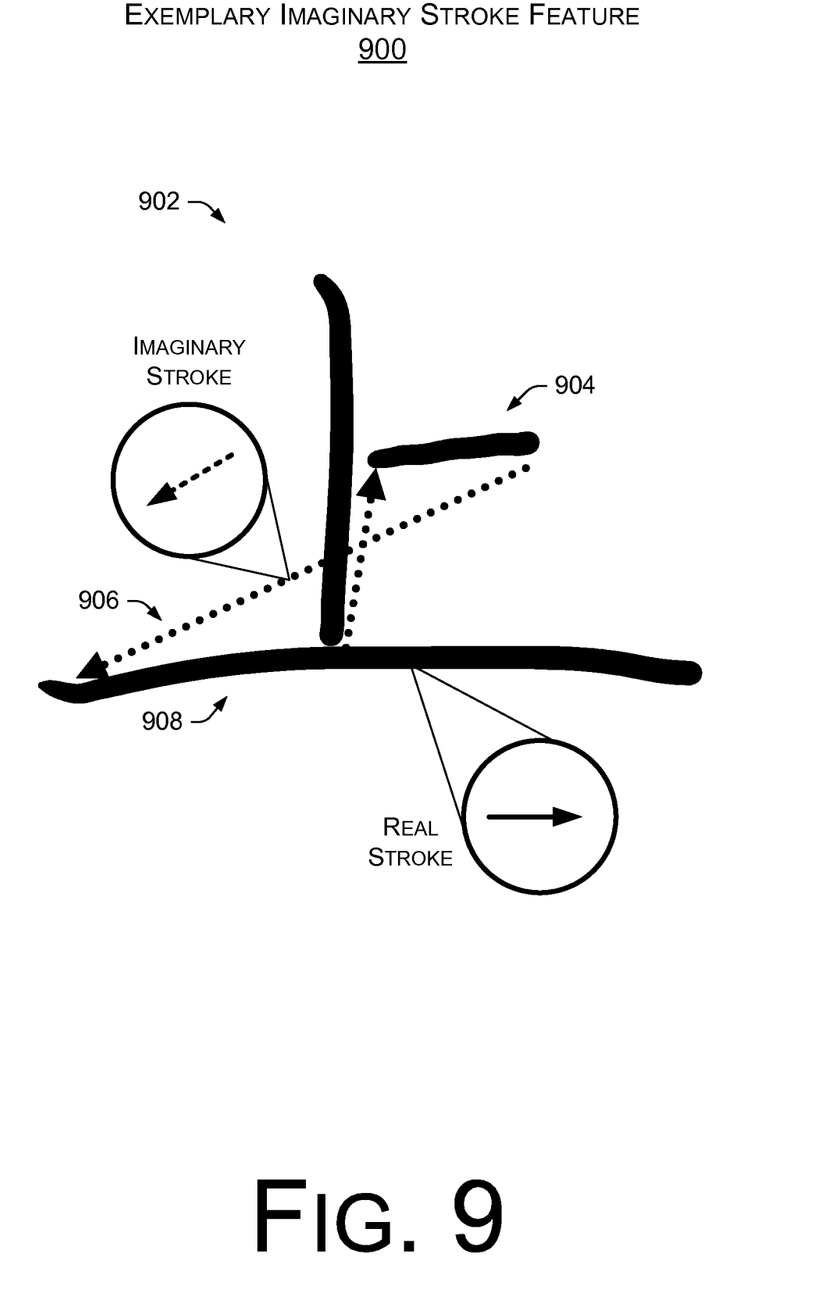
FIG. 9 is a diagram of an EA character with reference to an exemplary imaginary stroke feature.

FIG. 9 shows the imaginary stroke feature 900 as applied to a Chinese character 902. Imaginary stroke feature 900 can generate a flag indicating that a current ink frame is located on a real stroke or an imaginary stroke. For example, if the current ink frame is on real stroke 904 or 908, the flag for the feature value is set to 0 whereas if the current ink frame is on the imaginary stroke 906, then the value is set to 1. As described herein, such imaginary stroke information can be used to improve accuracy of a HMM based character recognition system.

As described herein, an exemplary method for online character recognition of East Asian characters can include acquiring time sequential, online ink data for a handwritten East Asian character, conditioning the ink data to produce conditioned ink data that includes information as to writing sequence of the handwritten East Asian character and extracting features from the conditioned ink data where the features include a tangent feature, a curvature feature, a local length feature, a connection point feature and an imaginary stroke feature. An exemplary method may include fewer than all of these features and may include other features.

In the aforementioned method, conditioning can generate ink data frames of uniform length, for example, as defined between two ink data points. As mentioned, conditioning can generate a series of contiguous ink data frames that includes real stroke frames and imaginary stroke frames.

As mentioned, an exemplary method can determine neighborhoods where the neighborhoods are made of successive ink data frames. For example, in determining neighborhoods, a method can determine a turning angle between two adjacent ink data frames, determine a cumulative angle based on the turning angle and at least one other turning angle and compare the cumulative angle to a predetermined threshold to decide if the two adjacent ink data frames belong to the same neighborhood. For each neighborhood, a method can extract a local length feature.

With respect to a tangent feature, a method can determine a $\Delta x$ value and a $\Delta y$ value for each ink data frame (e.g., for a x, y Cartesian coordinate system) and with respect to a curvature feature, a method can determine a sine value and a cosine value for an angle between two adjacent ink data frames.

An exemplary method can use extracted features to train a Hidden Markov Model based character recognition system and to select an East Asian character as associated with a handwritten East Asian character using a Hidden Markov Model based character recognition system.

An exemplary computing device can include a processor, a user input mechanism, a display and control logic, implemented at least in part by the processor, to recognize an online, handwritten East Asian character based on a character recognition algorithm that uses a Hidden Markov Model and features extracted from online, handwritten East Asian character ink data. Such features may include one or more of the following: a tangent feature, a curvature feature, a local length feature, a connection point feature and an imaginary stroke feature. Such a computing device can include control logic to uniformly sample the ink data and to generate ink data frames of uniform length, control logic to generate a series of contiguous ink data frames from the character ink data where the series of ink data frames includes real stroke frames and imaginary stroke frames, control logic to generate ink data frames from the character ink data and to determine, for a x, y Cartesian coordinate system, a $\Delta x$ value and a $\Delta y$ value for each ink data frame, control logic to generate ink data frames from the character ink data and to determine a sine value and a cosine value for an angle between two adjacent ink data frames, and control logic to generate ink data frames from the character ink data and to determine neighborhoods wherein each neighborhood comprises successive ink data frames. An exemplary computing device may be a cellular phone or other handheld computing device (e.g., a PDA, etc.).

Figure 10:
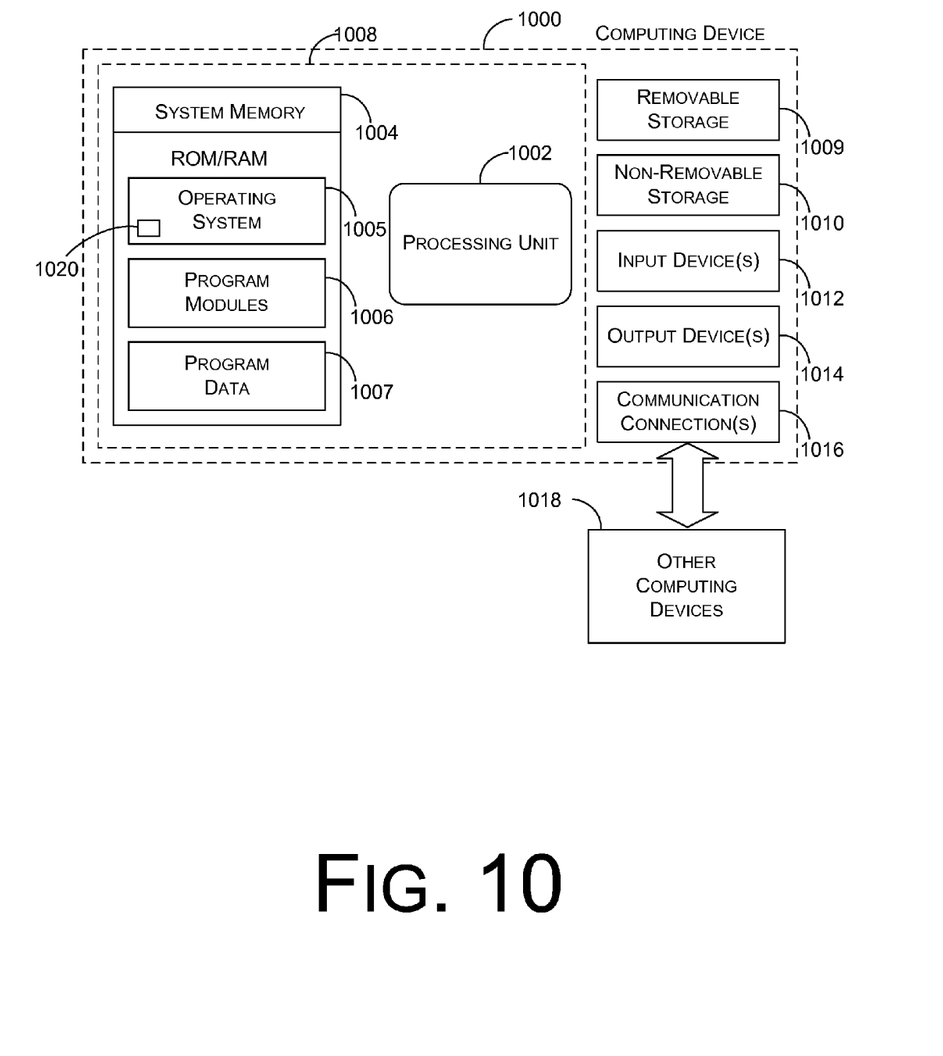
FIG. 10 is a diagram of various components of an exemplary computing device that may be used to implement part or all of various exemplary methods discussed herein (see also, e.g., the computing devices of FIG. 3).

FIG. 10 shows various components of an exemplary computing device 1000 that may be used to implement part or all of various exemplary methods discussed herein (see also, e.g., the computing devices 301 and 305 of FIG. 3).

The computing device shown in FIG. 10 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 10, an exemplary system for implementing an exemplary character recognition system that uses a features-based approach to conditioning ink data includes a computing device, such as computing device 1000. In a very basic configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination of the two. System memory 1004 typically includes an operating system 1005, one or more program modules 1006, and may include program data 1007. This basic configuration is illustrated in FIG. 10 by those components within dashed line 1008.

The operating system 1005 may include a component-based framework 1020 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1000 may also have input device(s) 1012 such as keyboard, mouse, pen, voice input device, touch input device, etc. Output device(s) 1014 such as a display, speakers, printer, etc. may also be included. These devices are well know in the art and need not be discussed at length here.

Computing device 1000 may also contain communication connections 1016 that allow the device to communicate with other computing devices 1018, such as over a network. Communication connection(s) 1016 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Referring again to FIG. 3, an exemplary computing device may include a processor, a user input mechanism (e.g., a mouse, a stylus, a scroll pad, etc.), a display and control logic implemented at least in part by the processor to recognize an East Asian character based on a character recognition algorithm that uses a Hidden Markov Model and a features-based approach to extract information from time sequential ink data. Such a device may be a cellular telephone or generally a handheld computer.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

What is claimed is:

1. A method comprising:
   under control of one or more processors configured with executable instructions:
   acquiring time sequential ink data for a character;
   conditioning the time sequential ink data to separate ink trajectories of real strokes and imaginary strokes into a plurality of ink frames, the conditioning comprising generating a plurality of contiguous time sequential frames for each imaginary stroke;
   extracting features from each ink frame of the conditioned ink data; and
   recognizing the character based on the extracted features using a character recognition model.

2. The method as recited in claim 1, wherein the acquiring comprises collecting the time sequential ink data for the character online as a user writes the character on a recording surface using a writing implement.

3. The method as recited in claim 1, wherein each of the imaginary strokes comprises an imaginary linear movement connecting two neighboring real strokes.

4. The method as recited in claim 1, wherein the conditioning further comprises re-sampling the time sequential ink data to convert the time sequential ink data into uniform sampled data, the sampled data enabling the character recognition model to perform character recognition independent of a speed of writing the character.

5. The method as recited in claim 4, wherein the re-sampling further comprises filtering redundant data from the time sequential ink data.

6. The method as recited in claim 1, wherein the character recognition model comprises a Bayesian model or a Hidden Markov Model.

7. The method as recited in claim 1, further comprising analyzing each ink frame based on one or more predetermined features, the one or more predetermined features comprising a tangent feature, a curvature feature, a local length feature, a connection point feature and/or an imaginary stroke feature.

8. The method as recited in claim 7, wherein the tangent feature is used for assessing the character as a link of direction movements and capturing a writing direction for each ink frame.

9. The method as recited in claim 7, wherein the curvature feature is used for recognizing a state transition from a previous writing direction to a next writing direction for the character.

10. The method as recited in claim 7, wherein the local length feature is used for characterizing a total trajectory length of a neighborhood of an ink frame of the plurality of ink frames.

11. The method as recited in claim 7, wherein the connection point feature is used for determining one or more connection points for a neighborhood, the one or more connection points comprises at least one of a "X" connection point or a "T" connection point.

12. A character recognition system comprising:
   a processing unit;
   memory coupled to the processing unit;
   a feature extraction module stored in the memory and executable by the processing unit to recognize a handwritten character by using a character recognition model and to extract features from ink data of the handwritten character, the ink data comprising time sequential ink data, and the features being extracted comprising at least one of a tangent feature, a curvature feature, a local length feature, a connection point feature, or an imaginary stroke feature; and
   an acquisition module that re-samples the time sequential ink data to convert the time sequential ink data into uniform sampled data, the sampled data enabling the character recognition model to perform character recognition independent of a speed of writing the handwritten character.

13. The system as recited in claim 12, further comprising:
   an acquisition module that uniformly samples the ink data; and
   a frame module that analyzes the features of the ink data by breaking the ink data into a plurality of frames.

14. The system as recited in claim 12, wherein the acquisition module is further configured to filter redundant data from the time sequential ink data.

15. The system as recited in claim 12, wherein the character recognition model comprises a Bayesian model or a Hidden Markov Model.

16. The system as recited in claim 12, the system being configured to be integrated into a computing device.

17. One or more storage devices storing executable instructions that, when executed by one or more processors, configure the one or more processors to perform acts comprising:
   acquiring time sequential ink data for a character;
   conditioning the time sequential ink data to separate ink trajectories of real strokes and imaginary strokes into a plurality of ink frames, the conditioning comprising generating a plurality of contiguous time sequential frames for each imaginary stroke;
   extracting features from each ink frame of the conditioned ink data; and
   recognizing the character based on the extracted features using a character recognition model.

18. The one or more computer storage devices as recited in claim 17, wherein the character recognition model comprises a Bayesian model or a Hidden Markov Model.

19. The one or more computer storage devices as recited in claim 17, wherein the conditioning further comprises re-sampling the time sequential ink data to convert the time sequential ink data into uniform sampled data, the sampled data enabling the character recognition model to perform character recognition independent of a speed of writing the character.

* * * * *